United States Patent [19]

Dunchock

[11] Patent Number: 5,048,083

[45] Date of Patent: Sep. 10, 1991

[54] AUTOMOTIVE TELEPHONE MOUNTING DEVICE

[76] Inventor: Richard Dunchock, 34032 Selva, Unit 96, Laguna Niguel, Calif. 92677

[21] Appl. No.: 470,723

[22] Filed: Jan. 26, 1990

[51] Int. Cl.$^5$ .................... H04M 1/00; B62D 43/00; B60R 7/00; B60R 11/02

[52] U.S. Cl. .................... 379/454; 379/455; 224/275; 224/42.42; 296/37.8

[58] Field of Search .................... 379/454, 455, 457; 381/86, 87; 455/89, 345, 346; 180/90; 296/37.8, 37.14; 224/275, 42.42, 42.45 R

[56] References Cited

U.S. PATENT DOCUMENTS

| | | | |
|---|---|---|---|
| 3,344,236 | 9/1967 | Chipping | 455/89 |
| 4,061,971 | 12/1977 | Barrons | 455/346 |
| 4,196,319 | 4/1980 | Gates | 379/451 |
| 4,611,734 | 9/1986 | Luecking et al. | 224/42.42 |
| 4,640,542 | 2/1987 | Watjer et al. | 296/37.8 |
| 4,842,174 | 6/1989 | Sheppard et al. | 379/454 |

FOREIGN PATENT DOCUMENTS 2581605 11/1986 France .................... 296/37.8

Primary Examiner—Jin F. Ng
Assistant Examiner—Jason Chan
Attorney, Agent, or Firm—Stetina and Brunda

[57] ABSTRACT

A telephone mounting device attachable alongside the center console of an automobile without causing destruction of any portion of the console. The device comprising a housing or shelf-like structure sized and configured to be positionable adjacent to center console of an automobile and to have a telephone position thereon. A console engaging member extends from the housing or shelf-like structure so as to frictionally engage at least a portion of the console. A second portion of the housing or shelf-like structure is engageable to the automobile, adjacent the center console, to hold the housing or shelf-like structure in its operative position. Generally, such anchoring of the housing or shelf-like structure is achieved by passing bolts or screws into the carpeted floorboard beneath the center console. Thus, if it is desired to subsequently remove such bolts or screws, the permanent holes created thereby will be covered by the carpeting and concealed from view.

7 Claims, 9 Drawing Sheets

AUTOMOTIVE TELEPHONE MOUNTING DEVICE

FIELD OF THE INVENTION

The present invention pertains generally to the art of automotive accessories and more particularly to a device for mounting cellular telephones and similar accessories adjacent to the center console (i.e., an elongate console positioned between the two front seats) of an automobile.

BACKGROUND OF THE INVENTION

It has heretofore been common practice in the art to mount cellular telephones and similar automotive accessories directly on accessible areas of an automobile instrument panel and/or center console (i.e. the console positioned between the driver seat and front passenger seat of the automobile). Recent trends in automotive design have, however, resulted in a diminution of available mounting space for cellular telephones and similar accessories.

In efforts to create more space for mounting telephones and/or other accessories, some installers have utilized mounting brackets for attaching the telephone and/or other accessory to the side of the automobile center console. Such mounting brackets are typically attached to the center console by way of screws or bolts. Thus, if it is subsequently desired to remove the telephone or other accessory, extraction of the screws or bolts leaves unsightly holes in visible portions of the center console.

Accordingly, there exists a need in the art for an improved bracket or other device for mounting cellular telephones and similar accessories alongside the center console, without drilling holes in or otherwise damaging visible portions of the console.

SUMMARY OF THE INVENTION

The present invention provides a telephone mounting device which is removably attachable alongside the center console of an automobile, without the need for drilling holes in or otherwise damaging the console.

Basically, the telephone mounting device of the present invention comprises a housing or shelf-like structure having at least one console engaging-member (e.g. a flange) extending therefrom, to frictionally engage a portion of the console. The shelf-like structure is further anchorable to another portion of the automobile interior, apart from the center console, to hold the shelflike structure in a fixed position, with the console-engaging member remaining in continuous frictional engagement with the console.

In accordance with a first embodiment of the invention the "console-engaging member" may comprise a lug, flange, hook, tongue or other projection sized and configured to be at least partially insertable under a portion of the console. This first embodiment of the invention is particularly useable in connection with center consoles which are designed to incorporate a vertical sidewall or lip which extends partially over top of the center floorboard hump of the automobile. In accordance with such design, the lug, flange, hook, tongue or other projection is sized and configured to be slidably advanced to an operative position between the vertical sidewall or lip of the console and the underlying floorboard hump. When so positioned, the frictional engagement of the lug, flange, hook, tongue or other projection with the console will prevent the shelf-like structure or housing from being pulled or otherwise moved laterally away from the console. The telephone mounting device of this invention is preferably installed by first placing the lug, flange, hook, tongue or other projection disposed in its operative position and subsequently anchoring the housing or shelf-like structure underlying floorboard hump or other part of the vehicle. Such anchoring holds the shelf-like structure in fixed position relative to the console and also serves to insure that the lug, flange, hook, tongue or other projection remains disposed in its operative position between the vertical sidewall or lip of the console and the underlying floorboard hump. By such arrangement, even if the bolts, screws or other anchoring members become loosened, the top of the housing or shelf will not separate from the console and will remain in abutment therewith.

In a second embodiment of the invention, the console-engaging member comprises a lug, flange, hook, tongue, or other projection which extends from the shelf-like member and which is sized and configured to slidably advance over, rather than under, a portion of the console. This second embodiment of the invention is particularly useable when the design of the center console will not permit a lug, flange or other member to be inserted under the console. In this second embodiment, the lug, flange, hook, tongue, or other projection may be specifically configured to be insertable into a well or depression formed within the upper surface of the console. For example, a downwardly extending member, in the nature of a flattened panel or other projection may be specifically sized, configured and positioned to be insertable into the ashtray-housing or other opening formed in a standard automobile center console. In such embodiment, it is desirable that the console engaging member (e.g., the lug, flange, hook, tongue, panel or other projection) be narrow enough to reside within the ashtray housing or other depression/recess formed in the console without interfering with the normal functioning of the ashtray and/or other console-mounted components. The telephone mounting device of the present invention may be covered with vinyl, leather or other material. It is desirable that the material covering the telephone mounting device substantially match the visible portions of the center console and/or dashboard of the automobile.

Further aspects and advantages of the invention will become apparent to those skilled in the art upon reading and understanding the following detailed description and the accompanying drawings.

BRIEF DESCRIPTION OF THE DRAWINGS

FIGS. 2a-2d show a second embodiment of the telephone mounting device of the present invention, positioned in relation to the center console, center floorboard hump of an automobile, during installation thereof.

FIG. 4b is a left side perspective view of the second telephone mounting device in accordance with the present invention.

FIG. 8b is a left side perspective view (inverted) of the alternative embodiment of the fifth telephone mounting device of the present invention shown in FIG. 8a.

DETAILED DESCRIPTION OF THE PREFERRED EMBODIMENTS

Figure 1A:
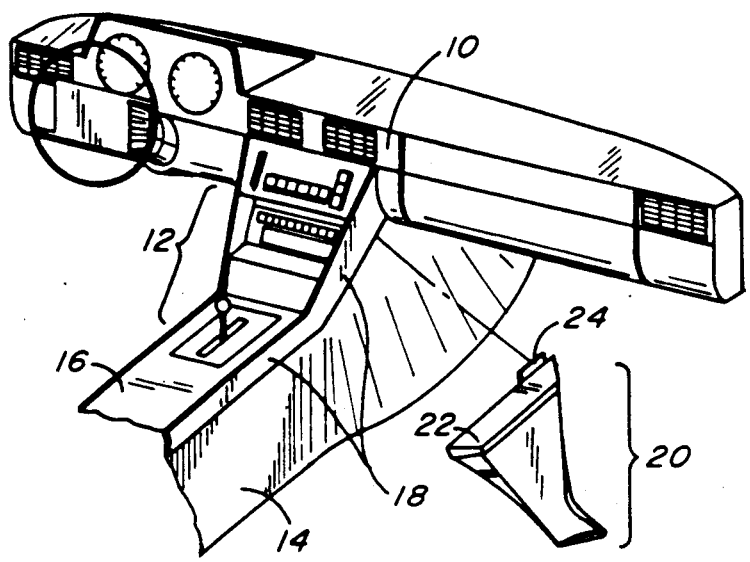
FIGS. 1a-1d show a first embodiment of the telephone mounting device of the present invention, positioned in relation to the center console and center floorboard hump of an automobile, during installation thereof.

The following detailed description and the accompanying drawings are intended to illustrate and describe the specific embodiments of the invention and are not intended to limit the scope of the invention in any way.

FIGS. 1a–1d illustrate, in a step-wise fashion, the installation of a first embodiment of the telephone mounting device of the present invention. In general, FIGS. 1a–1d show a portion of an automobile interior comprising an instrument panel 10 and a center console 12. The center console 12 is mounted on top of a carpeted floorboard hump 14 which serves to accommodate the rear extent of the automobile transmission and other drive train components positioned beneath the floor of the automobile's interior compartment. The center console further comprises a generally flat upper surface 16, with generally vertical sidewalls 18 or lips extending along the lateral edges of the console 12. At least a portion of each vertical sidewall 18 extends downwardly, in the nature of a lip, over the carpeted floorboard hump 14. Although the lower extent of each sidewall 18 or lip is in direct abutment with the underlying center floorboard hump 14, there is generally sufficient space therebetween permit relatively narrow objects to be slidably advanced underneath the console sidewall 18, between the lower edge thereof and the underlying carpeted center hump 14. Also the center floorboard hump 14 is usually covered by carpeting. The compressibility of the carpet nap further enhances the ability to insert an object or member between the carpet and floorboard hump 14 and the console 12.

Figure 1B:
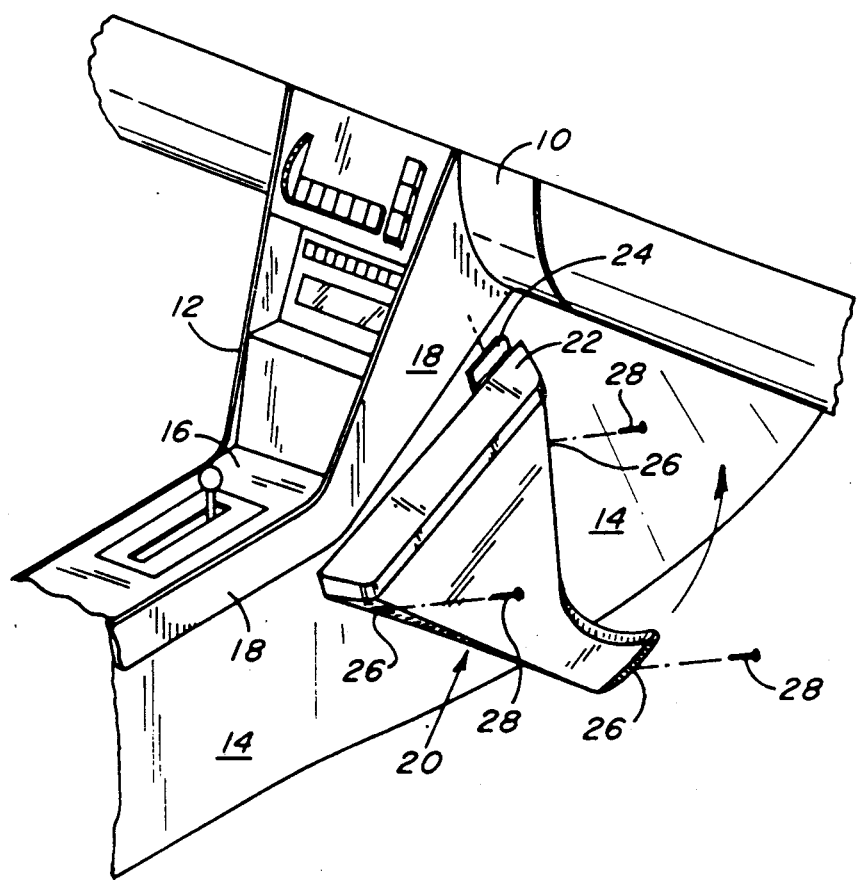
Figure 1C:
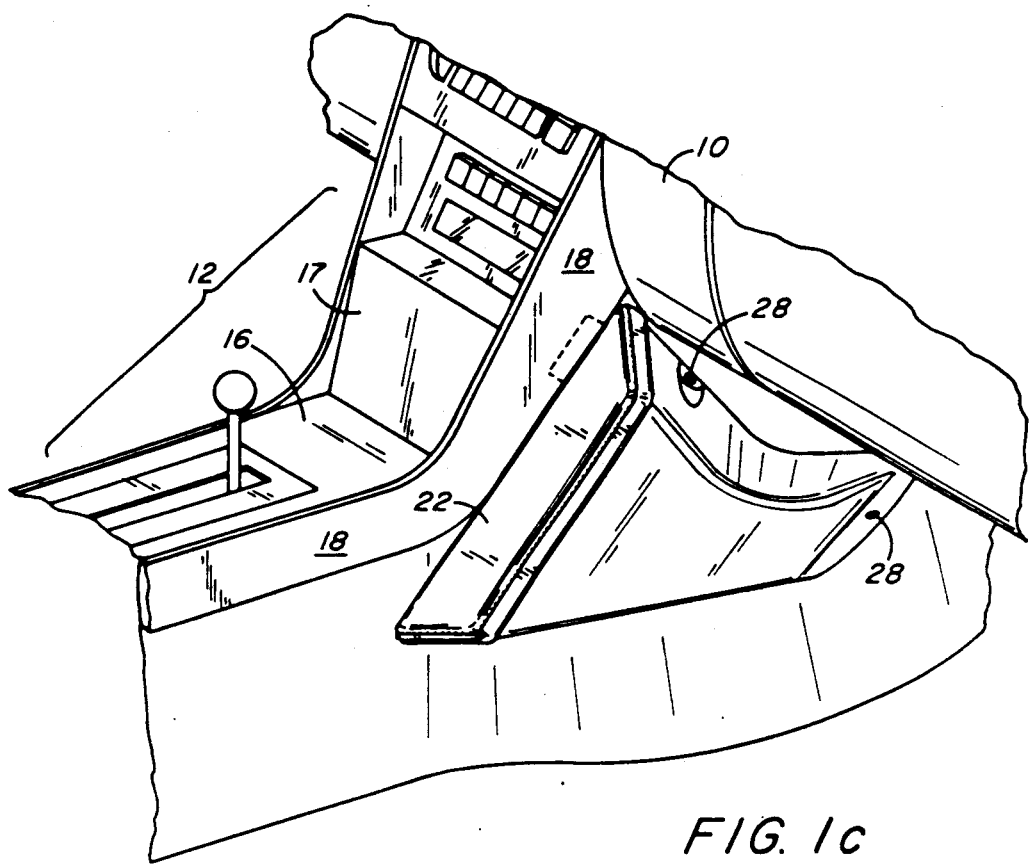
Figure 1D:
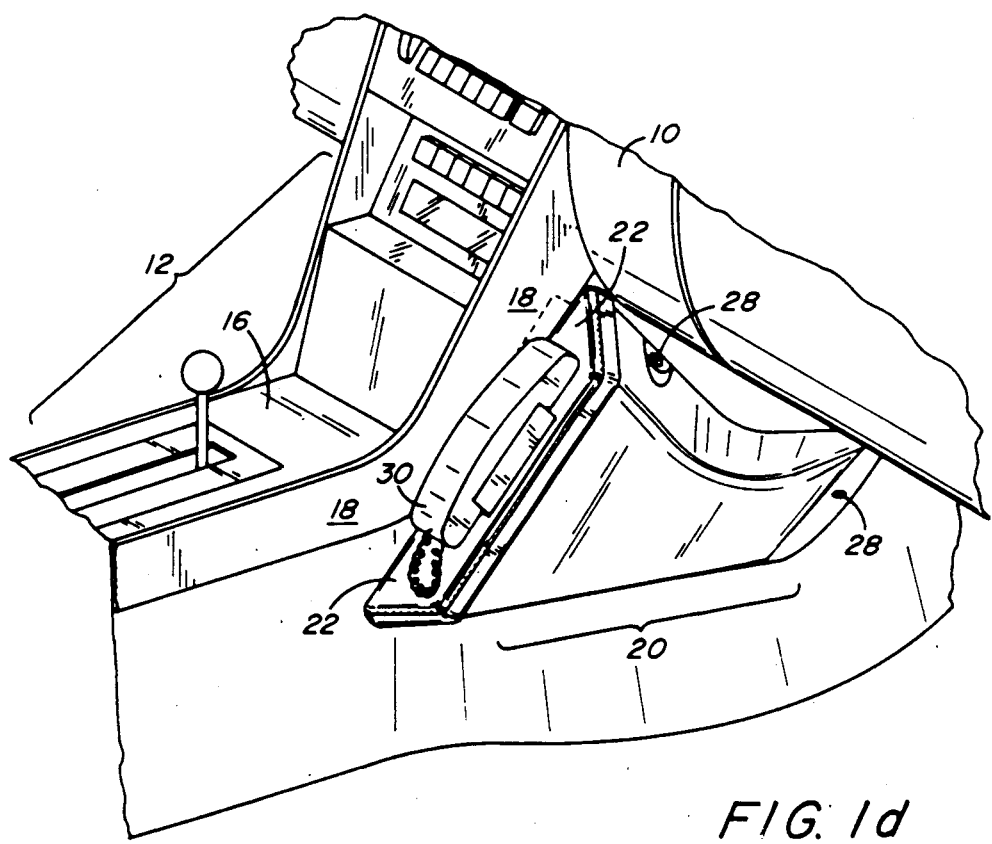

A shelf-like structure 20 or housing is provided with a generally flat upper surface 22 upon which a telephone may be mounted. A lug projection 24 is attached to and extends from the inner edge of the shelf-like structure 20. The projection 24 is sized and configured to be slidably insertable between the lip-like vertical sidewall 18 of the console and the underlying carpeted center floorboard hump 14. (FIG. 1b–1c). The configuration and angular attitude of projection 24 is such that, when inserted beneath or inside of the lip-like vertical member 18 of the console 12, the projection 24 will serve to hold the upper portion of the shelf-like structure 20 directly adjacent to and/or in abutment with the lip-like vertical sidewall 18 of the console 12.

The lower portion of the shelf-like structure 20 is contoured to be juxtapositionable against the side of the carpeted floorboard hump 14 and to extend below the front surface of instrument panel 10. Screws 28, bolts or other attachment members are then passed through the apertures 26 and into the floorboard hump 14. This holds the shelf-like structure 20 in firm operative position while the placement of the projection 24 under the vertical lip member 8 of the console 12 insures that the upper surface 22 of the shelf-like structure 20 remains stable and in close contact with the console 12.

A telephone 30 is mounted on the upper surface 22 of the shelf-like structure 20 and is thereby held in a position which is readily accessible to the driver and/or passenger of the vehicle.

If it is subsequently desired to remove the telephone 30 and shelf-like structure 20, such may be done simply by removing screws 28, pulling the shelf-like structure away from the center floorboard hump 14 and extracting the projection 24 from its position under the vertical lip 18 of the console 12. The entire shelf-like structure 20 and telephone 30 may then be removed from the vehicle. Because the center floorboard hump 14 is generally covered with carpeting, the holes made by screws 28 in the underlying floorboard will be fully concealed and covered by the nap of the carpeting. No holes, punctures or other damage have resulted in the vertical lip 16 or other portion of the console 12. Thus, the interior of the automobile has not been visibly damaged or aesthetically altered by the mounting and subsequent removal of the shelf-like structure 20 of the invention.

Figure 2A:
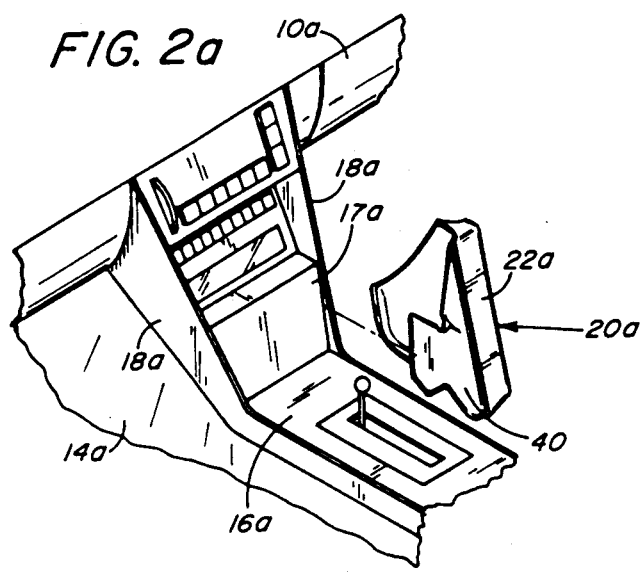
Figure 2B:
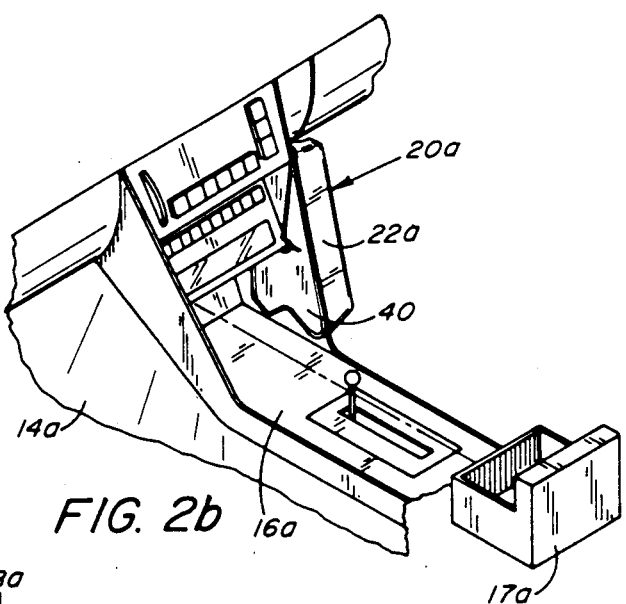
Figure 2C:
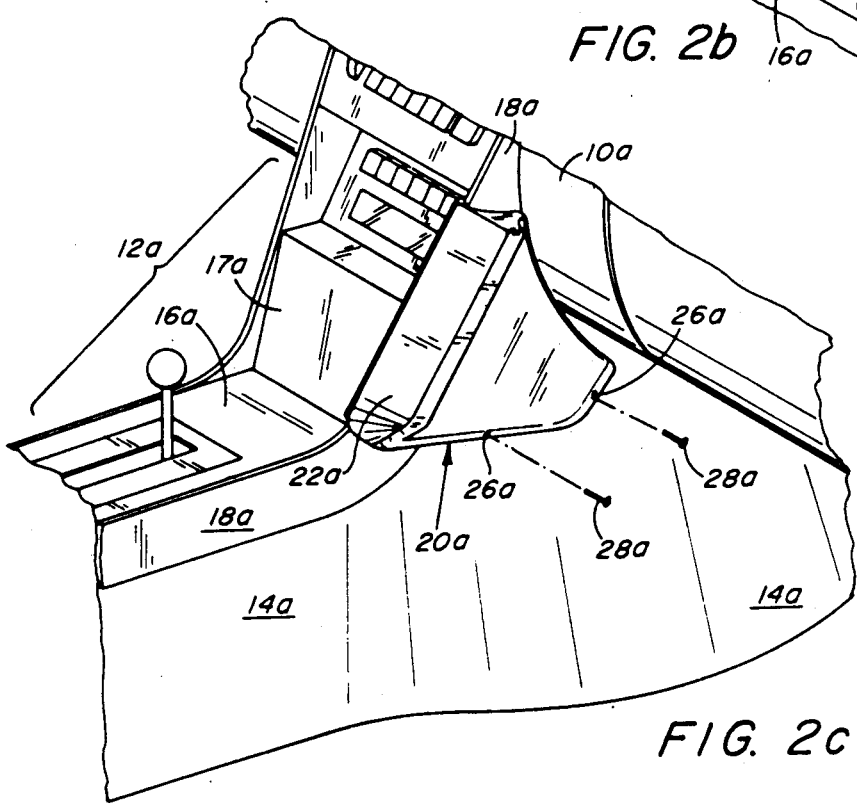

FIGS. 2a–2c depict an alternative or second embodiment of the invention being mounted in an automobile interior. Again, the portion of the automobile interior shown comprises an instrument panel 10a, a center console 12a comprising a generally flat upper surface 16a and generally vertical sidewalls or lip members 18a on either side thereof. The second or alternative embodiment of the invention shown herein comprises a shelf-like structure 20a having a generally flat upper surface 22a upon which a telephone maybe mounted.

This alternative or second embodiment of the shelf-like structure 20a or housing differs from the above-described first embodiment 20 in that, instead of employing a member or projection 24 to insert beneath the vertical sidewall or lip 18 of the center console, this alternative or second embodiment 20a incorporates an a console-engaging member 40 that is sized and configured to slidably advance over top of the vertical sidewall or lip 18a of the center console, thereby holding the shelf-like structure 20a in its desired operative position adjacent to and/or in contact with the vertical sidewall lip member 18a.

As shown in FIGS. 2a-2c the console-engaging member 40 of the invention is specifically configured to insert between the outer edge of ashtray 17a and the sidewall 18a of the console. Specifically, as illustrated in FIG. 2b, the ashtray 17a is extracted to allow slidable advancement of the console-engaging member 40 along the inner surface of vertical lip member 18a. After the console-engaging member 40 has been fully inserted to its desired point of advancement, the ashtray 17a is reinserted as shown in FIG. 2c.

The console-engaging member 40 may be specifically configured to permit continued slidable movement and operation of the ashtray 17a when the console-engaging member 40 is fully inserted into its operative position (see FIG. 2b). Because the configuration of ashtrays and/or ashtray housings differs from automobile to automobile, the console-engaging member 40 will, accordingly, vary in size and configuration to accommodate the ashtray and/or ashtray housing design of the particular automobile into which it is to be inserted.

Bolt apertures 26a are formed in the lower portion of the shelf-like structure 20a. When the shelf-like structure 20a is in its operative position screws 28a or bolts are passed through apertures 26a and into the underlying floorboard hump 14a. Such positioning of these screws 28, bolts or other attachment members will serve to hold the shelf-like structure 20a firmly in its desired operative position. A telephone may then be mounted on upper surface 22a of shelf-like structure 20a so as to be readily accessible by the automobile driver and/or passenger.

If and when it is desired to remove the telephone and shelf-like structure 22a, one has simply to remove screws 20a, extract ashtray 17a and slidably lift the shelf-like structure 20a from the vehicle. The ashtray 17a may then be replaced in its operative position. The screw or bolt holes made in the floorboard hump 14a will not generally be visible to the interior compartment of the automobile because the floorboard hump 14a is generally covered by carpeting and the screw or bolt holes formed in the underlying floorboard will be easily covered by the nap of the carpeting.

FIGS. 3-8 show various specific designs of the present invention.

Figure 3A:
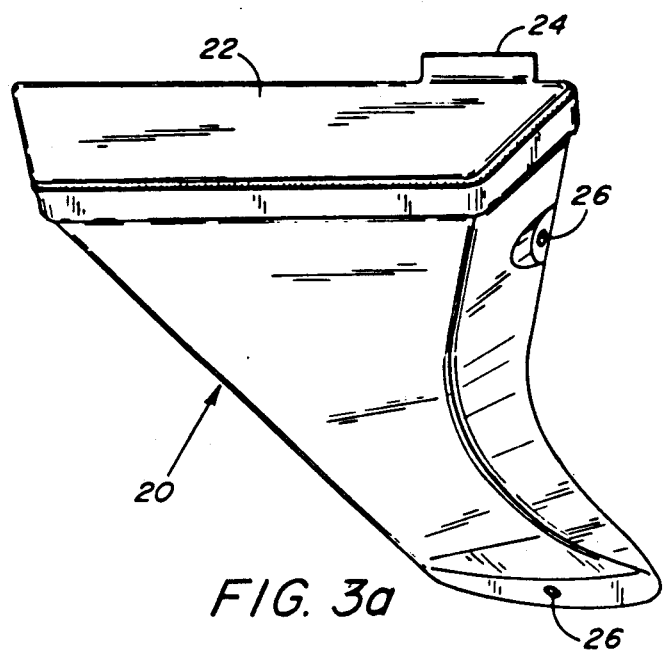
FIGS. 3a is a right side perspective view of the first design of a telephone mounting device in accordance with the present invention.
Figure 3B:
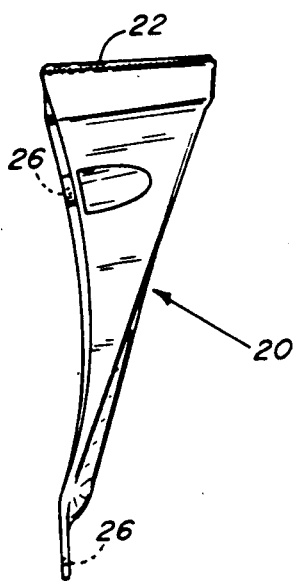
FIG. 3b is a front elevational view of the first telephone mounting device in accordance with the present invention.
Figure 3C:
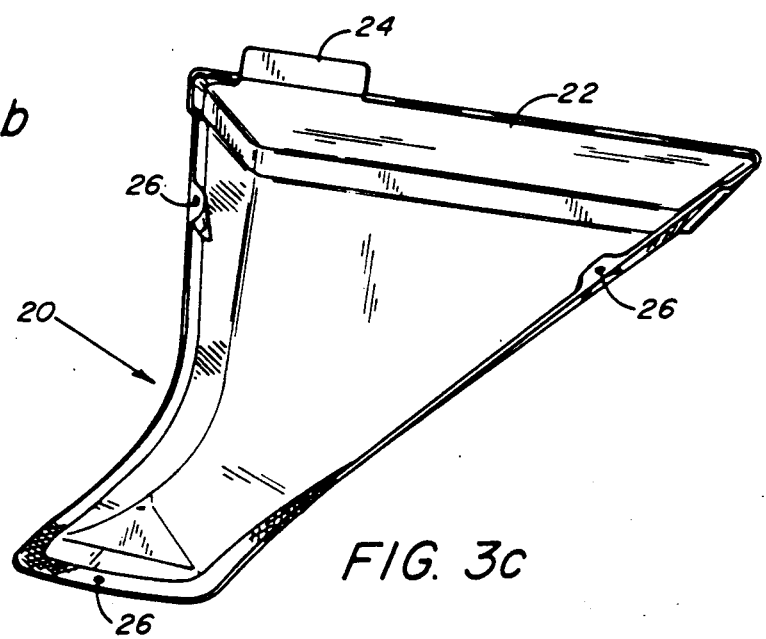
FIG. 3c is a left side perspective view of the first telephone mounting device in accordance with the present invention.
Figure 4A:
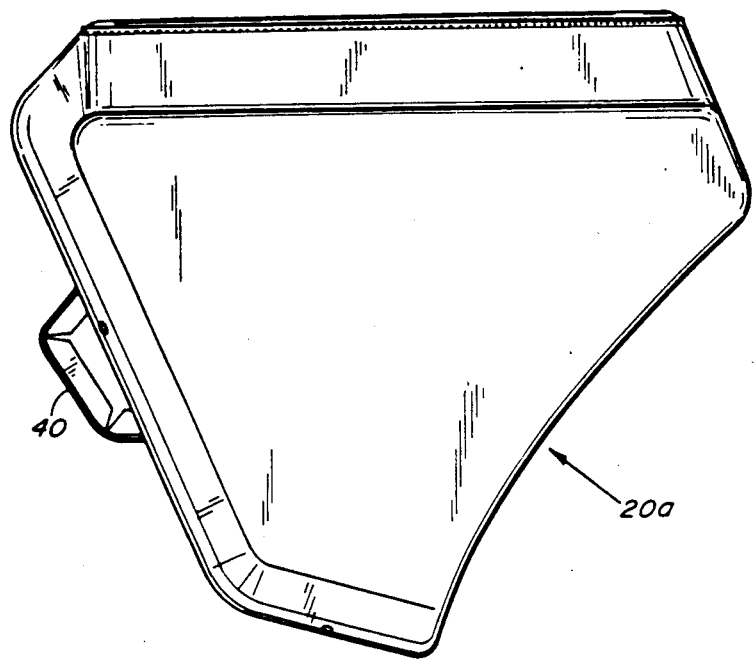
FIG. 4a is a right side perspective view of the second telephone mounting device in accordance with the present invention.
Figure 4C:
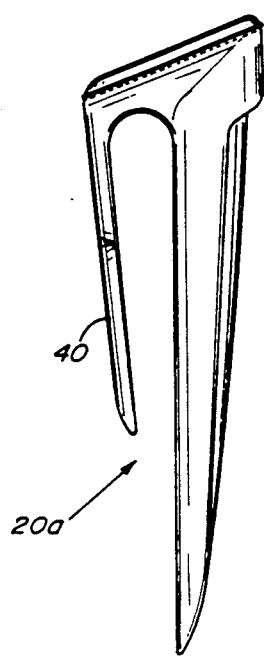
FIG. 4c is a rear elevational view of the second telephone mounting device in accordance with the present invention.
Figure 4C:
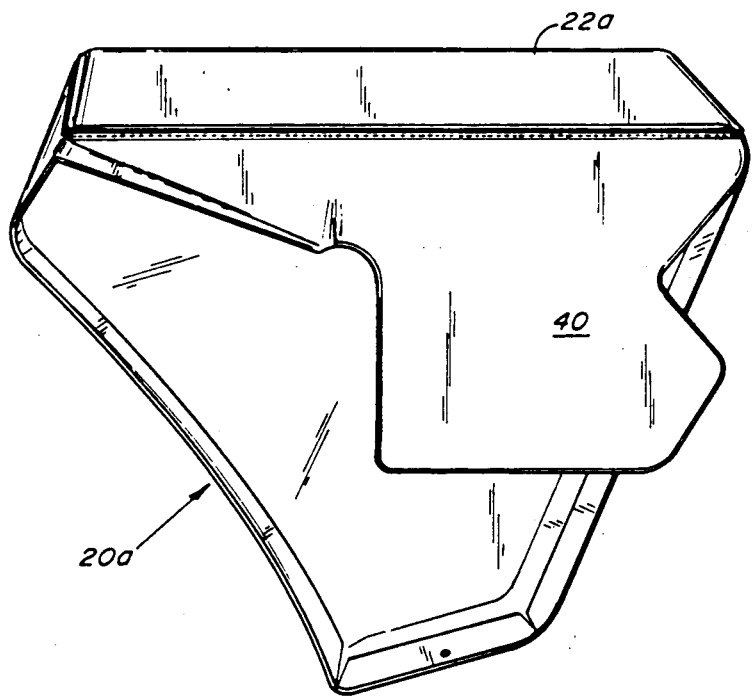
Figure 4D:
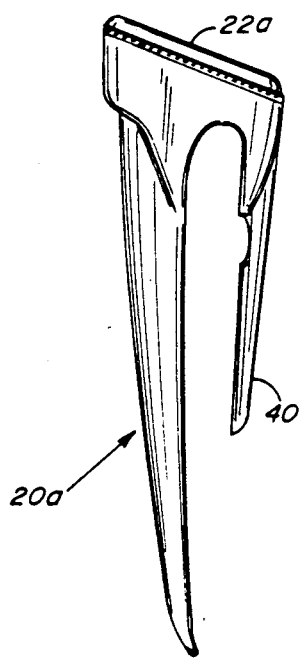
FIG. 4d is a front elevational view of the second telephone mounting device in accordance with the present invention.

FIGS. 3a-3c show more detailed views of the first telephone mounting device of the present invention illustrated in FIGS. 1a-1d. Such first telephone mounting device of the invention comprises a generally concave structure in the nature of a housing 20 having a shelf-like upper surface 22 and a generally rectangular flange 24 emanating from the frontal inner edge of the housing 20. A plurality of bolt receiving apertures 26 are formed in the lower portions of the housing. Initially, the rectangular flange 24 is inserted under a portion of the center console—between the console side wall and the underlying floorboard hump of the automobile. After the rectangular flange 24 has been so positioned, the remainder of the housing 20 will be placed alongside the center floorboard hump. One or more bolts 20 are then passed through apertures 26 into the underlying floorboard hump to securely hold the housing 20 in position adjacent the console. Subsequently, if the bolts become loosened, the engagement of the flange 24 under the portion of the center console (e.g. the side wall) prevent separation, loosening or instability of the upper surface 22 of the housing 20, even though said bolts have become loosened.

FIGS. 4a-4d show enlarged, more detailed views of the second telephone mounting device shown is FIGS. 2a-2c. With reference to FIGS. 4a-4d, the second telephone mounting device comprises a concave body in the nature of a housing 20a having a shelf-like upper surface 22a and a contoured member 40 emanating downwardly from the inner edge of said upper surface 22a. The contoured member 40 is sized and configured to slide downwardly into the ashtray housing or other depression formed in the inner portion or upper side of an automobile console. The space between the member 40 and the outer portion of the housing like structure 20a is such that, when the member 40 is operatively positioned within the ashtray housing or other console depression, the body of the housing 20a will be disposed next to the console such that the shelf-like upper surface 22a is disposed in an accessible position whereby a telephone may be mounted thereon. The lower portion of the housing 20a generally extends downwardly and rests adjacent the underlying floorboard hump. Bolts or screws are then passed through the lower portion of the housing 20a into the carpeted floorboard hump so as to hold the housing 20a in place with the member 40 so inserted in the ashtray housing or other console depression.

Figure 5A:
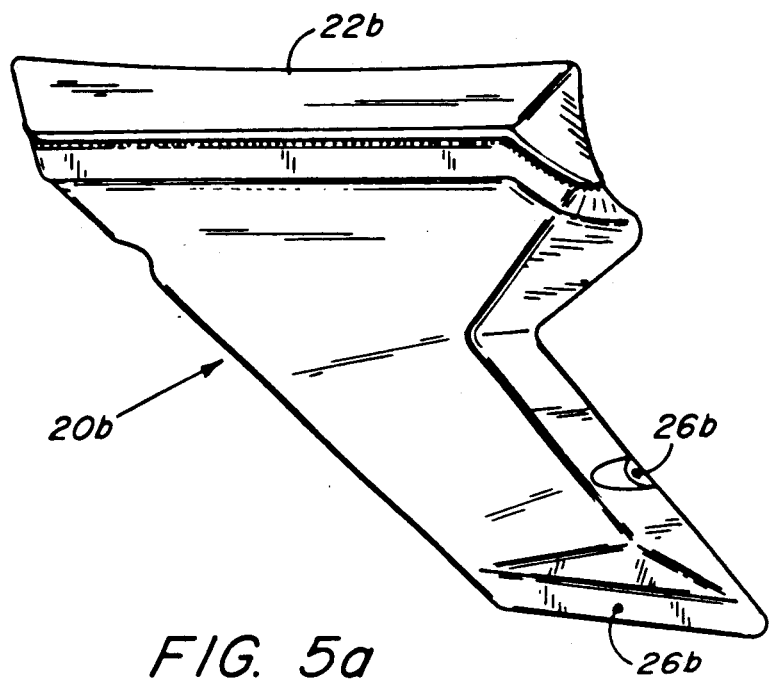
FIG. 5a is a right side perspective view of the third telephone mounting device in accordance with the present invention.
Figure 5B:
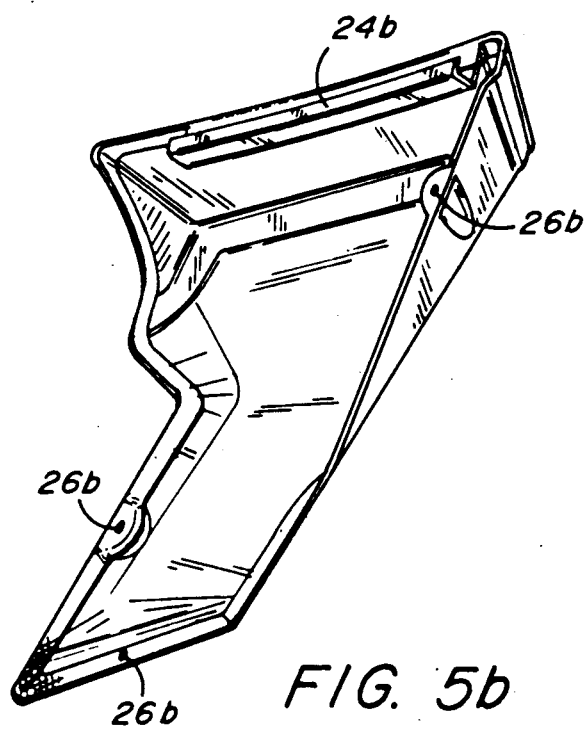
FIG. 5b is a left side perspective view of the third telephone mounting device in accordance with the present invention.

FIGS. 5a and 5b show another alternative design of a telephone mounting device of the present invention. Specifically referring to 5a-5b, there is provided a generally concave structure in the nature of a housing 20b having a shelf-like upper surface 22b and bolt receiving apertures 26b formed in the lower portion of the housing 20b. The console engaging member 24b is in the nature of a hook-like flange emanating from the left or inner side of the housing 20b so as to hook under and frictionally engage the vertical side wall, side lip or other portion of the console when the housing 20b is positioned next to the console. Passage of anchoring bolts through holes 26b will thereafter anchor the housing 20b in its desired operative position next to the console. If the bolts should subsequently become loosened, however, the hook-like flange 24b will remain in frictional engagement with the console and will prevent separation, loosening or instability of the upper surface 22b of the device in relation to the automobile center console.

Figure 6A:
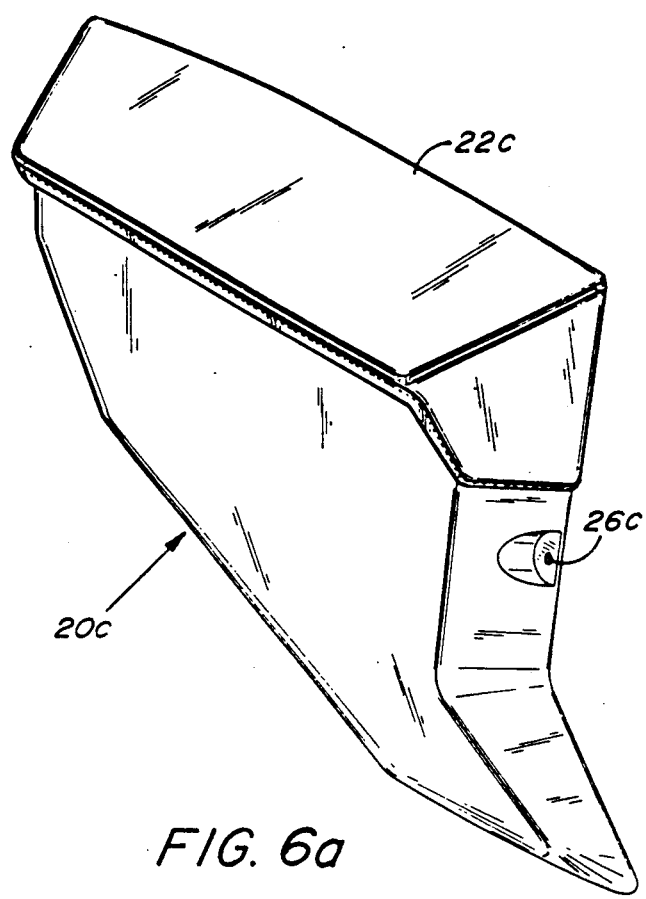
FIG. 6a is a right side perspective view of the fourth telephone mounting device in accordance with the present invention.
Figure 6B:
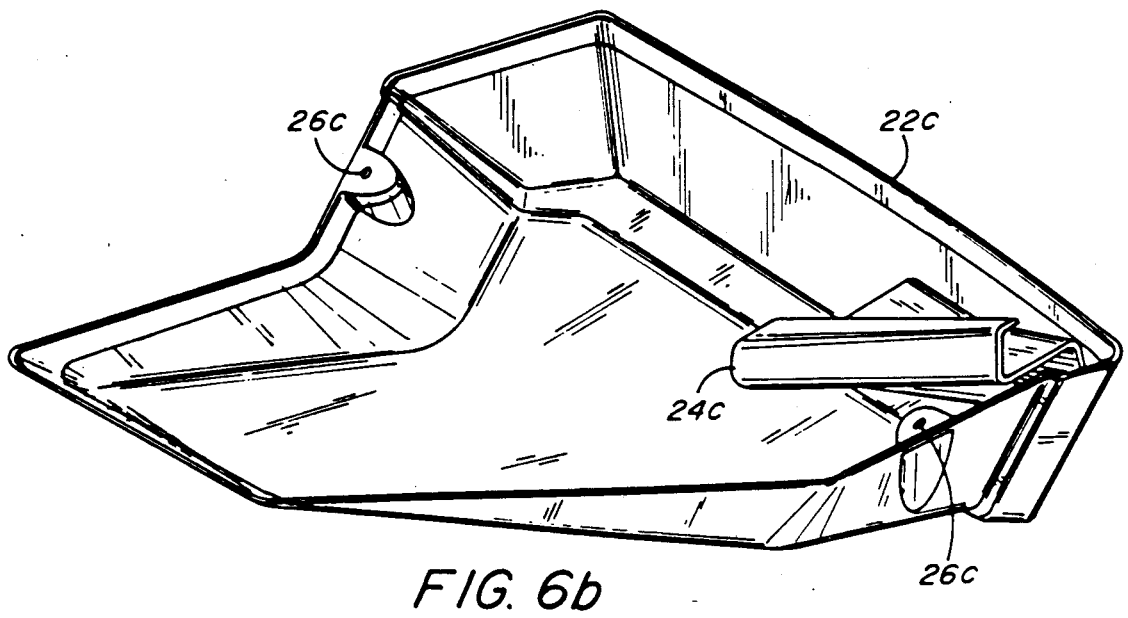

Another telephone mounting device in accordance with the present invention is shown in FIGS. 6a and 6b. Such third telephone mounting device comprises a generally concave structure in the nature of a housing 20c having an upper surface 22c and a plurality of bolt receiving apertures 26c formed in the lower portion of the housing 20c. The console engaging member of this third telephone mounting device of the present invention comprises a hooklike member 24c mounted on the left or inner side of the housing 26c at a slight angle relative to the body of the housing. Such hook-like member 20c is positioned on an angle relative to the body of the housing 20c and is slightly sloped or slanted to frictionally engage certain types of automotive consoles which have angular dispositions relative to the underlying automobile floor. Thus, this third telephone mounting device of the present invention has specific utility in connection with certain console configuration found in certain types of automobiles. It will be appreciated that console engaging members of various other sizes, shapes and angular dispositions may be employed for use in connection with other specific console designs.

Figure 7A:
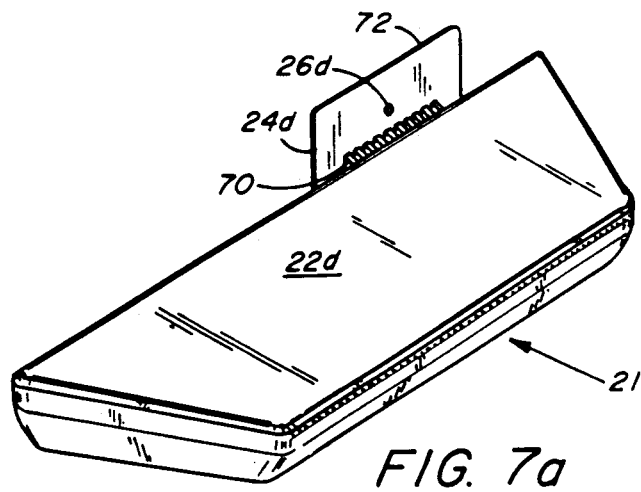
FIG. 7a is a right side perspective view of the fifth telephone mounting device in accordance with the present invention, incorporating a hinged mechanism for adjusting the angular position of the device in relation to an automobile center console.
Figure 7B:
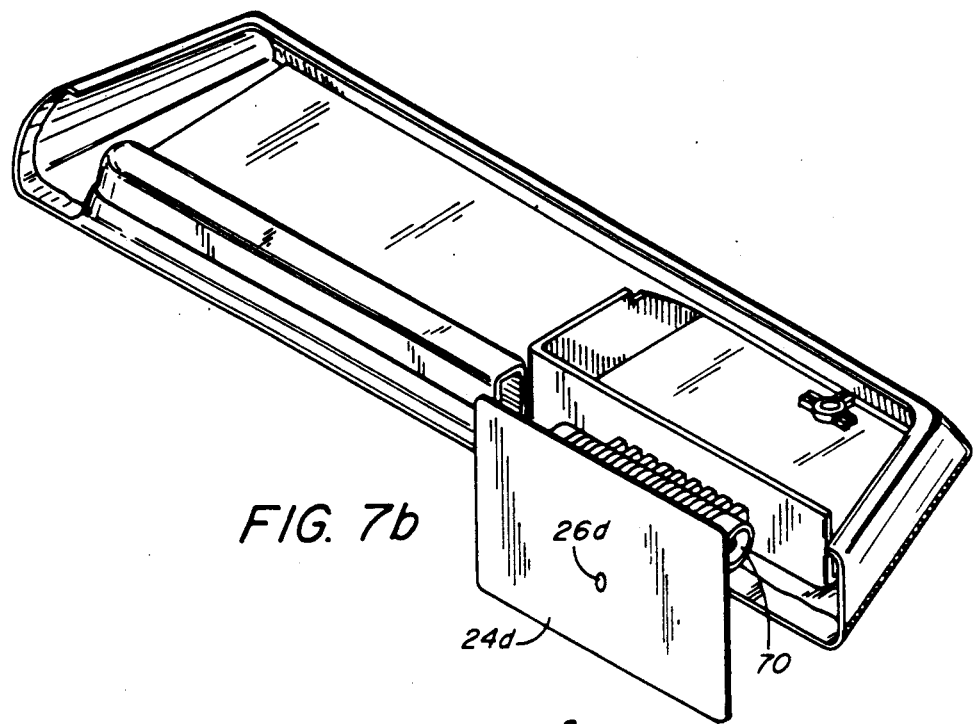
FIG. 7b is a left side or inside perspective view (inverted) of the fifth telephone mounting device in accordance with the present invention.
Figure 7C:
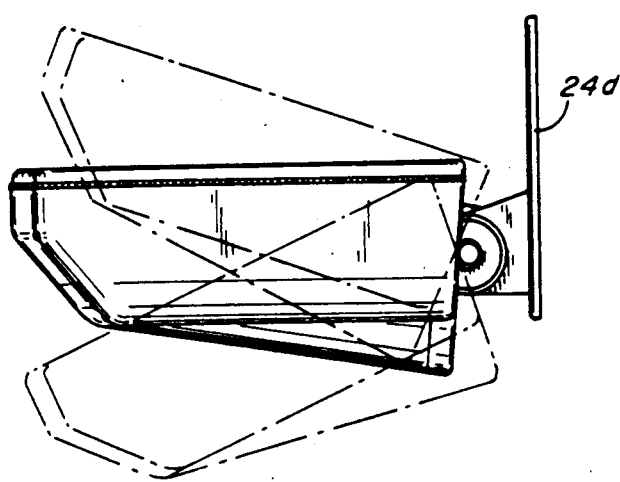
FIG. 7c is a front elevational view of the fifth telephone mounting device in accordance with the present invention showing the angular adjustability of such device in phantom lines.

A fourth telephone mounting device of the present invention is shown in FIGS. 7a-7c. Such fourth telephone mounting device comprises a molded plastic structure in the nature of a shelf 21 having a generally flat upper surface 22d upon which a telephone may be mounted. The console engaging member of the fourth telephone mounting device shown in FIGS. 6a-6c comprises a flat, rectangular panel connected to the shelf-like structure 21 by way of a hinge 70. The portion of the panel 24d which extends above the hinge 70 is at least partially insertable under the vertical side wall or other portion of the automobile console. A screw or bolt may then be passed through the aperture 26d formed in the rectangular panel and into the carpeted floorboard hump which underlies the console. Thus, the screw or bolt hole 26d should be positioned sufficiently far below the upper edge 72 so that, that portion of the rectangular panel between the upper edge 72 and the screw or bolt aperture 26d may reside under the center console while the bolt aperture 26d remains fully exposed to permit passage of a screw or bolt into the carpeted floorboard hump without interference with or damage to the console.

The hinge 70 is provided to allow the shelf-like structure 21 to be angularly adjusted with respect to the console after mounting has taken place. Such adjustment is shown by the phantom lines in FIG. 7c. A set screw is preferably provided within the hinge 70 to lock the hinge in a desired position. Thus, in practice, after the upper edge of the panel 24d has been inserted under the console and a screw or bolt has been passed through aperture 65d into the underlying floorboard hump of the vehicle, the desired angular position of the shelf-like structure 21 is set by moving hinge 70. Thereafter, a set screw (not shown) is tightened to hold hinge 70 in such desired position.

Figure 8A:
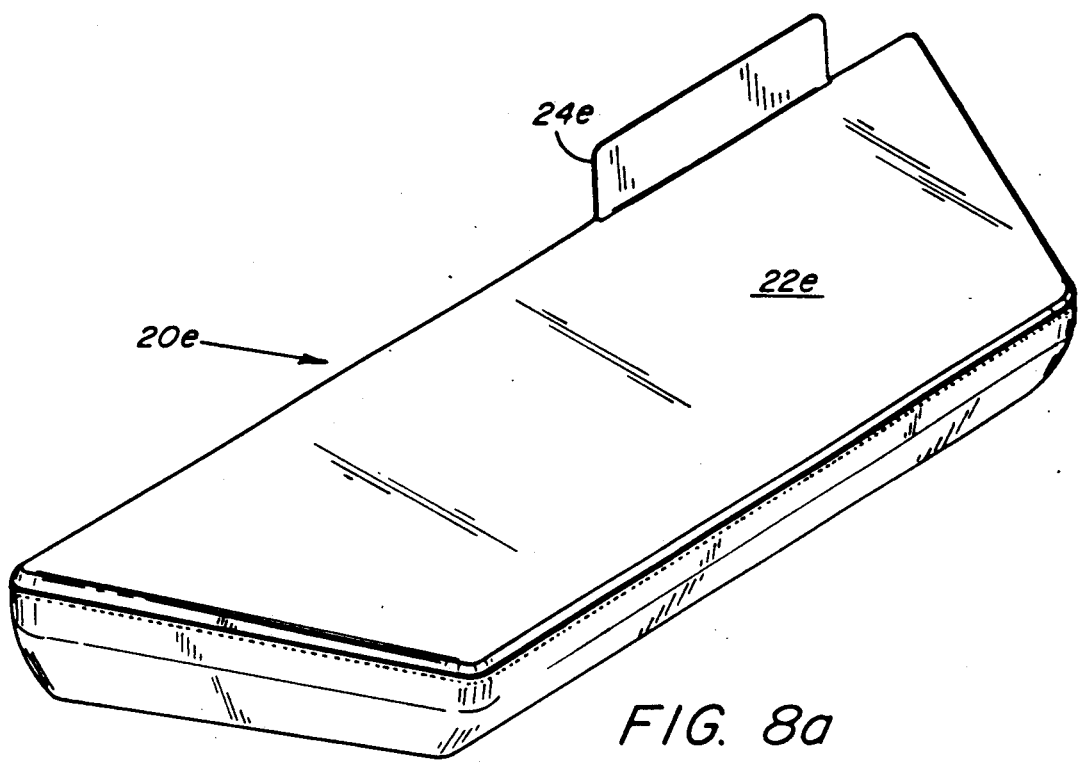
FIG. 8a is a right side perspective view of an alternative embodiment of the fifth telephone mounting device of the present invention having no hinge for angular adjustment of the device.
Figure 8B:
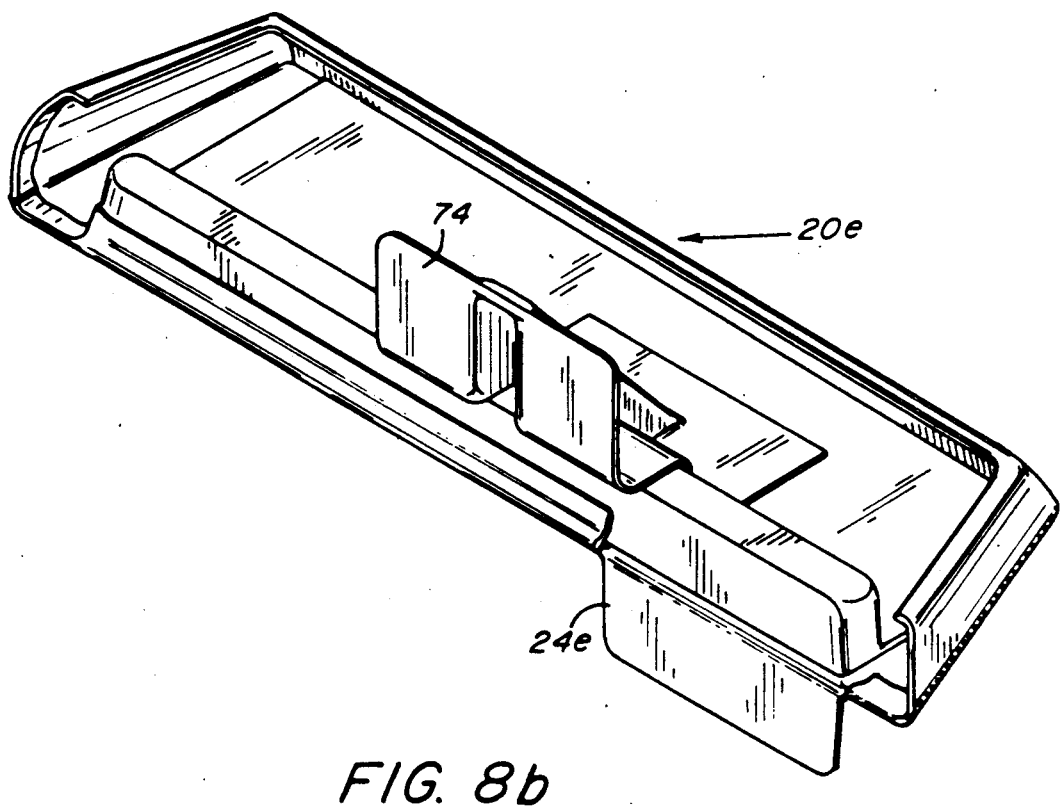

A variation of the fourth telephone mounting device shown in FIG. 7a-7c is shown in FIGS. 8a-8b. The device shown in FIGS. 8a-8b differs from that shown in FIGS. 7a-7c in that it does not incorporate the hinge 70 for angular adjustment. Additionally, the console engaging member of the device shown in FIGS. 8a-8b incorporates a flat, rectangular member 24e emanating from the left or inner side of the device and extending generally higher than and next to the upper surface 22e of the shelf-like member 20e. A separate support member 74 is affixed to the underside of the shelf-like structure 20e such that, when the rectangular flange 24e is positioned under the vertical side wall or lip of a center console the support member 74 will rest against the underlying floorboard hump. Screws, bolts or other attachment members may then be passed through the support member 74 and into the underlying floorboard hump so as to hold the shelf-like structure 20e in its operational position next to the console. With the rectangular flange 24e securely inserted between the console and the underlying floorboard hump, such flange 24e will prevent the shelf-like structure 20e from moving laterally away from the console, even if the bolts or screws used to mount the abutment member 74 to the underlying floorboard hump should become loose.

The foregoing detailed descriptions and the accompanying drawings are intended only to describe specific embodiments and designs of the invention. Since numerous modifications and changes will readily occur to those skilled in the art, the foregoing drawings and description shall not be construed as limiting the invention to the exact embodiments shown and described. Rather, it is intended that all suitable modifications and changes be regarded as falling within the scope of such description and within the scope of the following claims and the equivalents thereof.

What is claimed is:

1. A telephone mounting device which is attachable alongside an automobile center console, without causing destruction of any portion of the console, wherein the center console has at least one vertical sidewall, said device comprising:
   a housing sized and configured for mounting against the center console and for supporting a telephone thereon; and
   a console-engaging member extending from a first portion of said housing to engage the housing to said center console;
   said housing having a second portion engageable to the automobile, beneath said center console, to hold the housing against said console;
   said console-engaging member having a member sized and configured to slip inboard of said vertical sidewall in such manner as to at least partially support said housing in an operative position next to said vertical sidewall and to substantially prevent said housing from being pulled laterally away from said console.

2. The telephone mounting device of claim 1 wherein said housing comprises a concave body having an upper surface for supporting telephone thereon and wherein said console-engaging member extends below said upper surface.

3. The telephone mounting device of claim 1 wherein the console has an ashtray housing depression formed therein and wherein the console-engaging member comprises a member sized and configured to insert into said ashtray housing depression.

4. A telephone mounting device attachable next to an automobile center console wherein the console is positioned on top of an underlying floorboard hump and wherein said console comprises at least one vertical sidewall having a lower edge which abuts said underlying floorboard hump, said device comprising:
   a housing having an upper surface, an inner side and an outer side, said upper surface being sized and configured to permit mounting of a telephone thereon;
   a console-engaging member extending from the inner side of the housing, said console-engaging member being sized and configured to slidably insert between the lower edge of the vertical sidewall of the console and the underlying floorboard hump;
   said housing being additionally anchorable to the underlying floorboard hump to hold the housing in fixed position relative to said console such that the console-engaging member remains in position under the vertical sidewall of the console, functionally engaging said vertical sidewall to prevent the housing from being pulled laterally away from said console.

5. The telephone mounting device of claim 4 wherein the console-engaging member comprises a projection sized and configured to be insertable under a portion of the center console.

6. The telephone mounting device of claim 4 wherein the console-engaging member comprises a flat projection sized and configured to be insertable under a portion of the center console.

7. The telephone mounting device of claim 4 wherein the console-engaging member comprises a curved projection, sized and configured to be insertable under a portion of the vertical sidewall of the center console.

* * * * *